United States Patent [19]
Tura

[11] Patent Number: 5,487,958
[45] Date of Patent: Jan. 30, 1996

[54] INTERLOCKING FRAME SYSTEM FOR LITHIUM-POLYMER BATTERY CONSTRUCTION

[76] Inventor: Drew Tura, 1965 Harmil Way, San Jose, Calif. 95125

[21] Appl. No.: 163,203

[22] Filed: Dec. 6, 1993

[51] Int. Cl.⁶ .................................................. H01M 10/04
[52] U.S. Cl. ........................ 429/151; 429/97; 429/130; 429/152; 429/157; 429/158; 429/159; 429/160; 429/163; 29/623.1
[58] Field of Search .......................... 429/96, 97, 130, 429/151, 152, 157, 158, 159, 160, 163; 29/623.1

[56] References Cited

U.S. PATENT DOCUMENTS

| | | | |
|---|---|---|---|
| 4,125,680 | 11/1978 | Shropshire et al. | 429/4 |
| 4,579,792 | 4/1986 | Bruder | 429/162 |
| 4,609,597 | 9/1986 | Plasse | 429/122 |
| 4,830,939 | 5/1989 | Lee et al. | |
| 4,997,732 | 3/1991 | Austin et al. | |

*Primary Examiner*—Prince Willis, Jr.
*Assistant Examiner*—M. Nuzzolillo

[57] ABSTRACT

Frames for batteries which are constructed of planar battery cells prevent the planar battery cells from shifting while the batteries are vacuum sealed. These frames do not add to the thickness of the batteries but have the advantage of increasing the rigidity of the battery, reducing the shifting of the battery cells during assembly, and preventing vulnerable edges which result in non-uniformities and low energy density. The interlocking frame design allows cells to be stacked onto a battery with relatively tight alignment, high volumetric efficiency and improved safety.

13 Claims, 4 Drawing Sheets

U.S. Patent  Jan. 30, 1996  Sheet 1 of 4  5,487,958
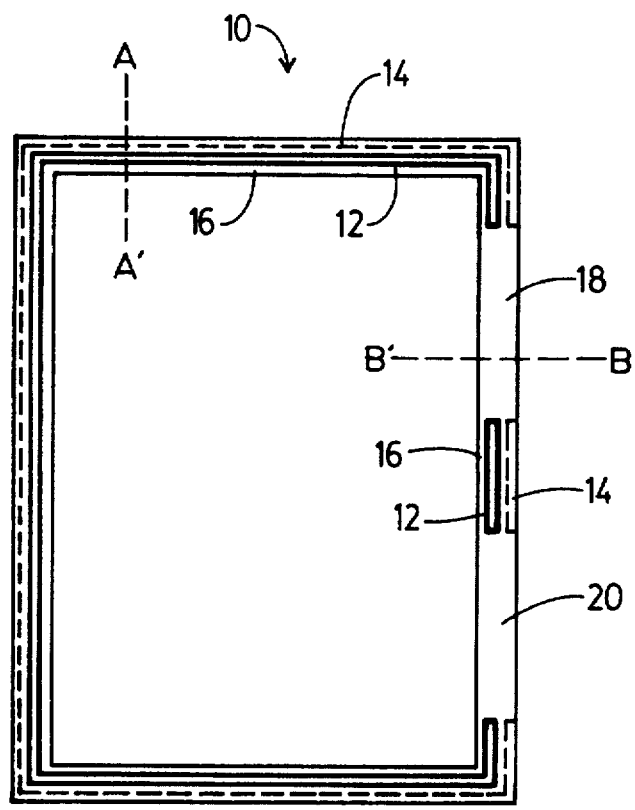
FIG._1.
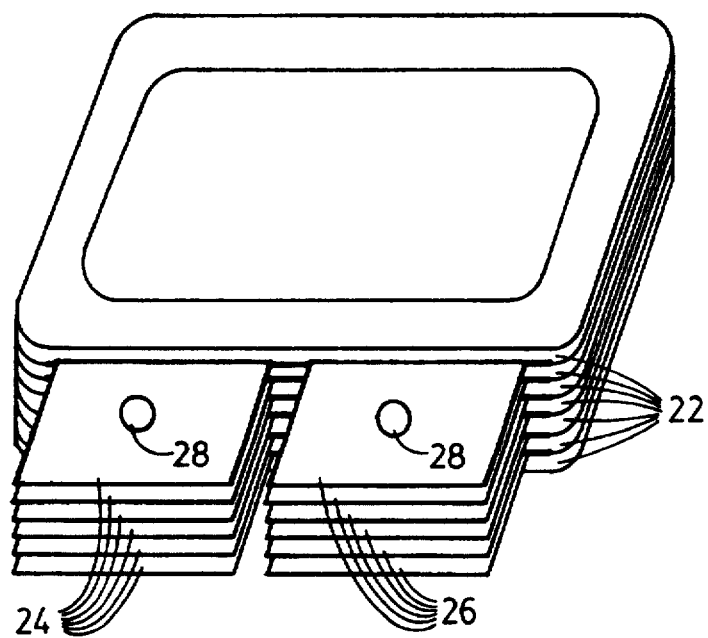
FIG._2.

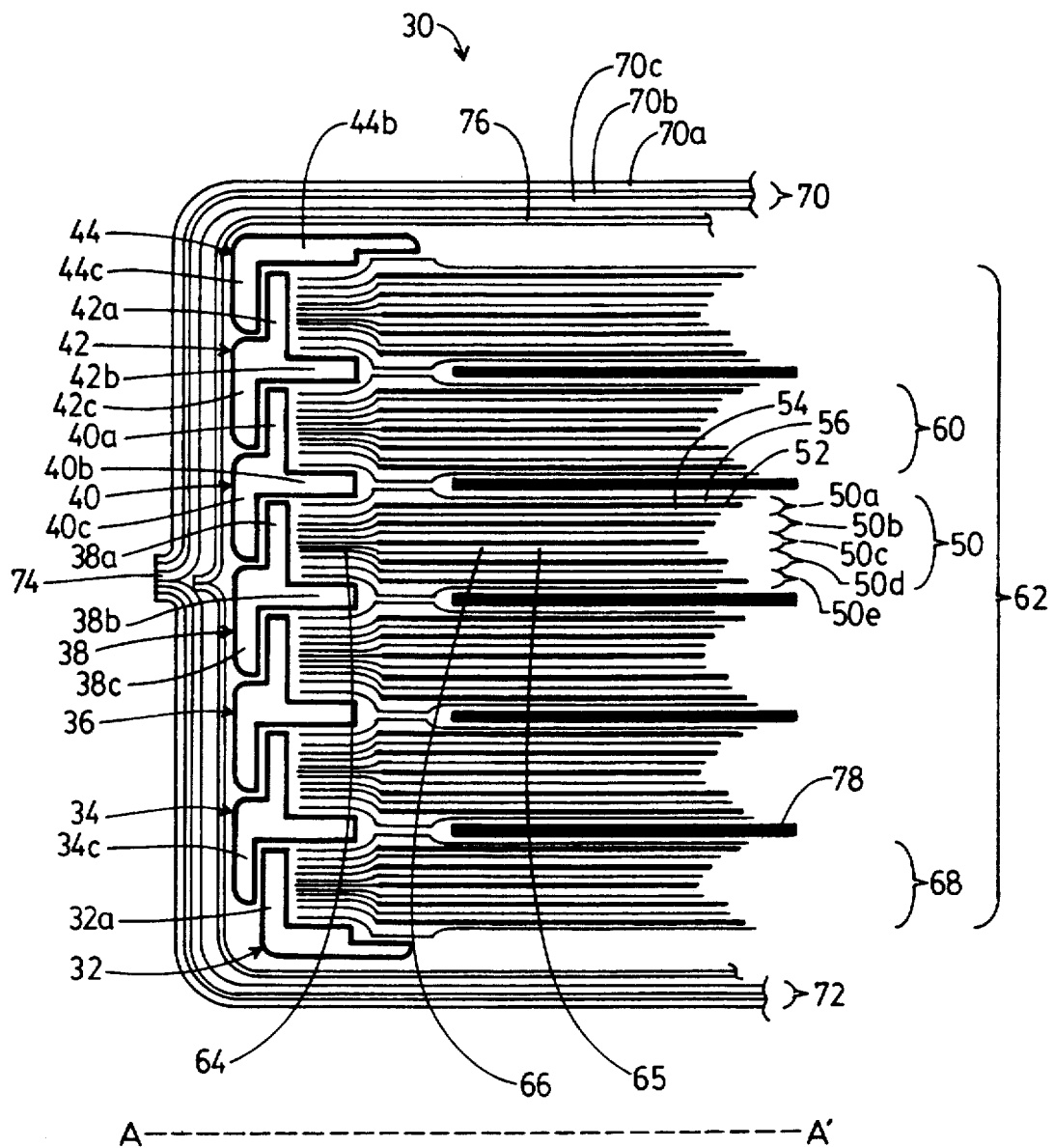
FIG._3.

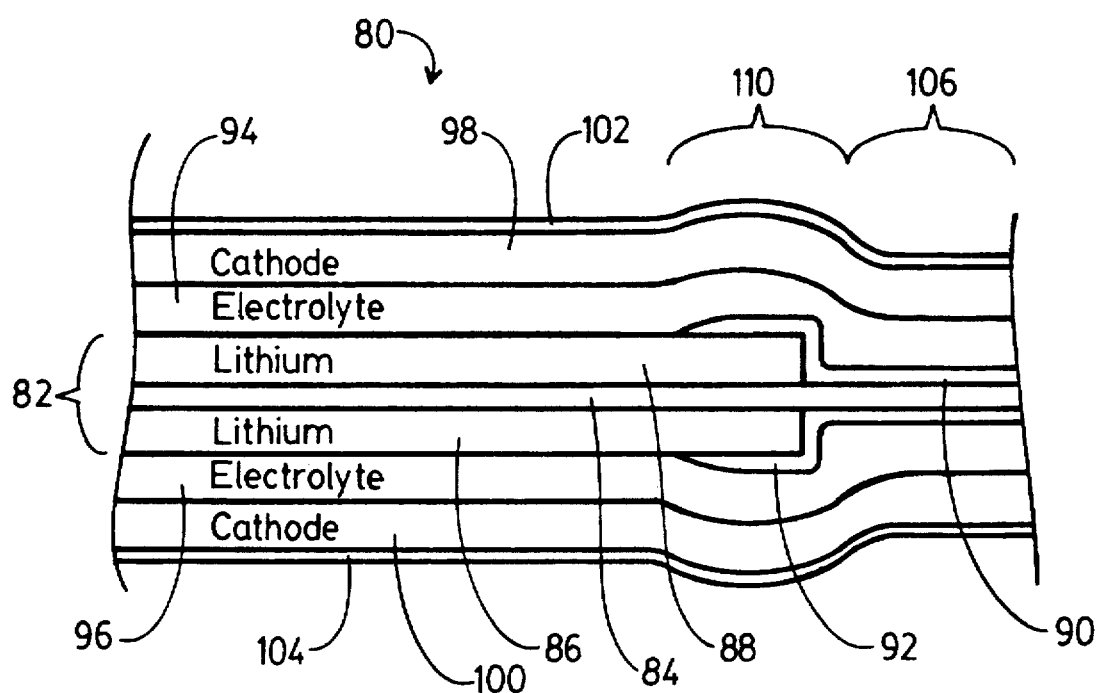
FIG._4.

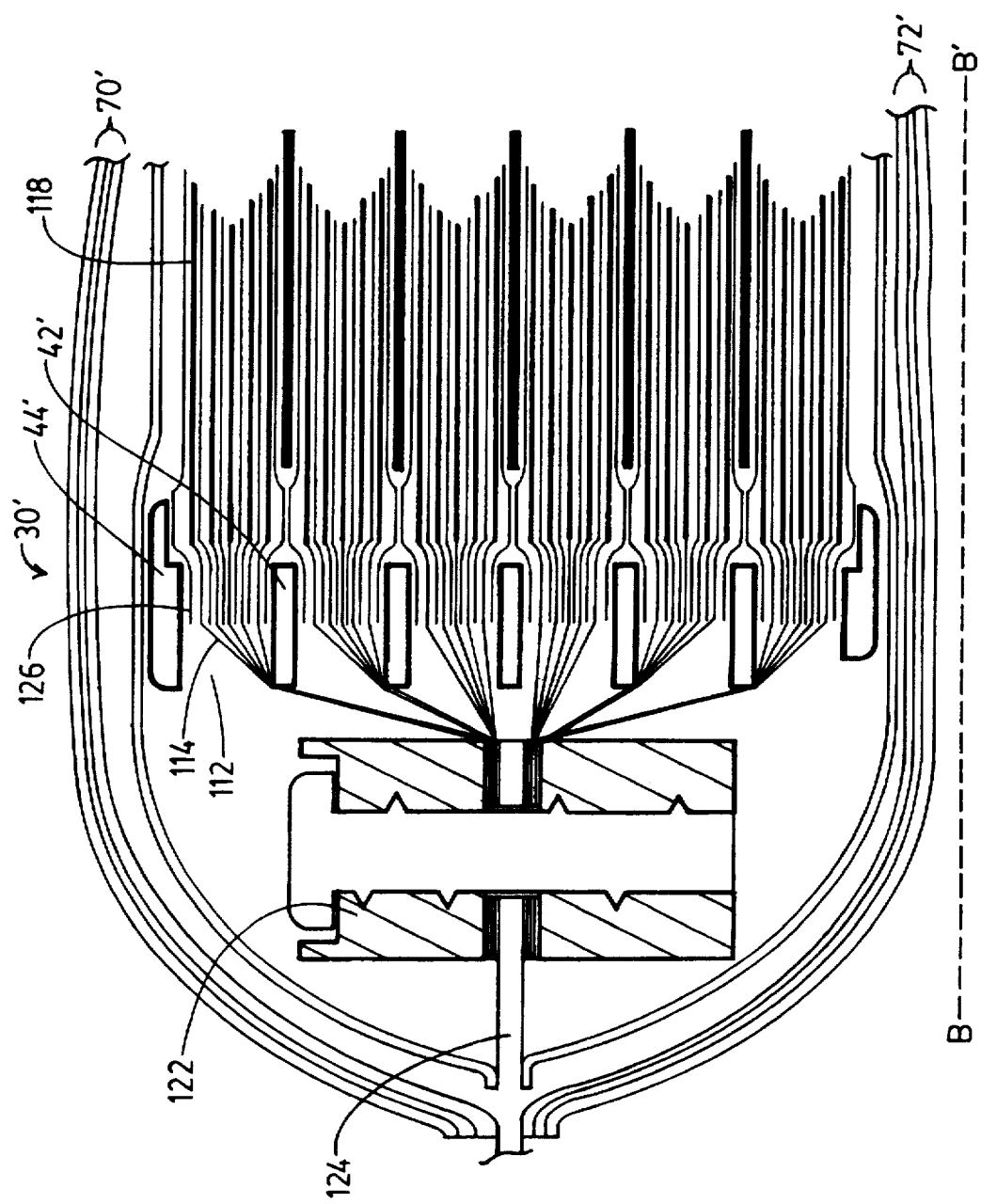
FIG._5.

5,487,958

INTERLOCKING FRAME SYSTEM FOR LITHIUM-POLYMER BATTERY CONSTRUCTION

BACKGROUND OF THE INVENTION

This invention relates to a method and apparatus for forming a battery. More specifically this application relates to the method and apparatus of forming a battery for use in automobiles.

Typically, car batteries are lead-acid batteries. The lead cell consists of positive and negative plates divided by separator materials. The active material of the positive plates is lead peroxide. The negative plate usually consists of a lead-antimony grid containing sponge lead as the active material, the electrolyte is sulfuric acid and water. These batteries tend to be large and bulky. It is desired to have a battery which is smaller and less bulky. Lighter, less bulky batteries will be especially needed for electric cars that are battery powered.

SUMMARY OF THE INVENTION

The present invention comprises a method and apparatus of forming a lithium-polymer battery using frames. A lithium-polymer battery can be smaller and of lighter weight than the typical lead-acid battery presently used in cars. A lithium-polymer battery is estimated to be one-half the volume and one-third the weight of typical car batteries.

The use of frames is beneficial in forming a lithium-polymer battery when this battery comprises a stack of planar lithium laminar battery cells. The frame protects the edges of the battery cells from damage when the cells are compressed together in the vacuum packaging of the battery. The frames allow for precise alignment and tight compression of the laminar battery cells to produce a high volumetric efficiency. The frames are designed to interlock, but not compress together under vacuum packaging. The frames prevent the pinching, buckling and fraying of electrode stack during assembling and packaging, and create a more rigid and robust structure. These frames can prevent shorting, skewing, and sluffing of the battery cells. Sluffing is the rubbing off of the electrolyte/cathode layer from the battery cells.

In accordance with the principles of the present invention, the above and other objectives are realized by using a battery comprising a battery section having first and second sides, a first frame including a first portion contacting the top of the battery section and a second portion protruding from the first portion. The battery also comprises a second frame with a first portion substantially parallel with the first portion of the first frame. The first portion of the second frame contacts the second side of the battery section and upper portion extending above the first portion, whereby the second portions of the first and second frame are arranged such that the movement of the battery section is restricted.

Additionally, the above and other objectives are realized by using a battery comprising a stack of planar battery cells, and a plurality of interlocking frames. The plurality of interlocking frames are adapted to restrict the planar battery cells from slipping with respect to one another.

In addition, the above and other objectives are realized by using a method of forming a battery comprising the steps of placing a stack of at least one planar battery cell on a frame, placing a second frame onto the stack so as to interlock with the first frame and restrict the horizontal shifting of the stack, and vacuum sealing the stack of at least one battery cell and first and second frame.

BRIEF DESCRIPTION OF THE DRAWINGS

The above and other features and aspects of the present invention will become more apparent upon reading the following detailed description in conjunction with the accompanying drawings, in which:

FIG. 1 is a top view of a frame of the present invention with protrusions upward shown normally and protrusions downward shown in hidden lines;

FIG. 2 is a perspective view of the frames of the present invention interlocked together as well as the tabs of the battery cell;

FIG. 3 is a partial cross-sectional view of the battery of the present invention;

FIG. 4 is a partial cross-sectional view of a lithium bi-cell used in the present invention;

FIG. 5 is a partial cross-sectional view of the battery of the present invention showing the tabs of the battery cells clamped to a terminal.

DETAILED DESCRIPTION OF THE PREFERRED EMBODIMENT

FIG. 1 is a top view of the frame 10 of the present invention. The frame 10 includes the protrusions upward 12 and the protrusions downward 14 shown in hidden lines. The frame 10 has a horizontal portion 16 on the inside of the frame. This horizontal portion 16 can be used for placing on top or beneath battery sections in the battery of the present invention. The upper portion 12 extends above the horizontal portion 16. The lower portion 14 extends below the horizontal portion 16. These upper and lower portions 12 and 14 may extend on all four sides of the frame. Additionally, areas 18 and 20 could be designed as described below so that the tabs of the battery cells can extend through a group of frames. The upper portion 12 and the lower portion 14 do not extend at areas 18 and 20. Alternately, the upper portion 12 and the lower portion 14 may be thinner at areas 18 and 20.

Notice that multiple frames with the design of frame 10 could interlock together if placed upon top of one another. That is, the lower portion of an additional frame, not shown, could surround the upper portion 12 of frame 10 on all four sides of the frame 10 such that the frame 10 is restricted in its horizontal movement. The areas 18 and 20 and the corresponding areas on other frames form spaces for the tabs to extend through when the frames are stacked.

Other designs of interlocking frames are possible. For example, the upper portion of one frame could surround and restrict the horizontal movement of an additional frame's lower portion. Alternatively, the frames could hook together to restrict horizontal motion.

The frame 10 in the preferred embodiment is made of plastic which could be machined, injection molded or cast into desired form. In the preferred embodiment, the frame is made of a non-flammable material such as a plastic with phosphate or bromide additives which are injection molded or cast.

FIG. 2 is a perspective view of the frames 22 of the present invention showing the anode tabs 24 and cathode tabs 26 of the battery cells. Notice that the frames 22 are interlocked together. Holes 28 are formed in the tabs 24 and 26 so that these tabs can be clamped together as described below.

FIG. 3 is a partial cross-sectional view of the battery 30 of the present invention. Shown in FIG. 3 are the frames 32, 34, 36, 38, 40, 42 and 44. Top frame 44 has a horizontal portion 44b that extends further to the right than the middle frames such as frame 42. The top frame 44 has a lower portion 44c that is used to surround the upper portion 42a of frame 42. Bottom frame 32 has a upper portion 32a that is surrounded by the lower portion 34c of frame 34. Frame 38 which is neither a top or bottom frame has a upper portion 38a, a horizontal portion 38b and a lower portion 38c.

In between the frames are battery sections such as battery section 50. In the present embodiment, battery section 50 is comprised of a stack of laminar bi-cells 50a, 50b, 50c, 50d and 50e. As described below laminar bi-cells such as laminar bi-cell 50a are comprised of a lithium anode section 52 and two cathode/electrolyte sections 54 and 56.

Note that horizontal portion 40b is located on top of battery section 50 and that horizontal portion 38b is located on the bottom of battery section 50. Frame 38 and frame 40 are arranged such that the battery section 50 is restricted in its horizontal movement. The upper portion 38a of frame 38 is placed in between the lower portion 40c of frame 40 and the battery section 50. The upper portion 38a and lower portion 40c may surround the battery section 50 on all four sides of the frame as shown in FIG. 1. The view of FIG. 3 is oriented along the line A—A' with respect to the frame 10 shown in FIG. 1.

Looking again at FIG. 3, note that a similar interlocking occurs for other battery sections such as battery section 60. An upper portion 40a of frame 40 interlocks with a lower portion 42c of frame 42. Upper portion 40a is located between the battery section 60 and the lower portion 42c of frame 42. In this manner, the horizontal movement of battery section 60 is restricted. The use of the frames can restrict the lateral movement of the battery sections such as the battery sections 50 and battery section 60, and can also restrict the lateral movement of the individual laminar bi-cells such as battery cells 50a, 50b, 50c, 50d, and 50e. In the preferred embodiment of the present invention, the laminar planar bi-cells such as bi-cell 50a form a single large stack 62. The large stack 62 is made of the small stacks such as stacks 50 and 60 which are placed in between the interlocking frames. These frames such as frames 40 and 38 have the upper and lower portions or obstructions to prevent the adjacent frames and the planar laminar battery cells from slipping with respect to one another.

Note that the height of the battery is largely determined by the width of the stack 62 of planar battery cells. In a preferred embodiment, the battery section 50, comprised of a stack of planar laminar battery cells, is thinner in the portion 64 located in between the frames 38 and 40. As described below, the portion 64 is thinner than the other portions of the battery section 50 because portion 64 does not contain the lithium but only the masks, electrolyte/cathode, and anode and cathode tabs. The thickest portion of the battery sections such as battery section 50 is the portion 66 which includes the masks, the lithium, the anode and cathode tabs and the electrolyte/cathode. This will be clearer with respect to FIG. 4 described below.

Looking again at FIG. 3, note that the thickness of the horizontal portions such as portions 38b and 40b do not significantly add to the thickness of the battery 30 since the portion 64 is thinner than portion 66 of battery section 50. In addition, in a preferred embodiment, the thickness of the portion 64 is greater than the length of the upper portion 38a so that the upper portion 38a does not contact the horizontal portion 40b of the frame above it. In this manner, the height of the battery 30 is not determined by the frames. The distance between the horizontal portions 38b and 40b is determined by the thickness of the portion 64 of the battery section 50. In a preferred embodiment the length of the upper portion such as upper portion 38a extends 60 mils above the horizontal portion 38b while the portion 64 of battery section 50 is 80 mils in thickness.

Previous multi-cell designs for the large lithium polymer batteries suffered from a lack of rigidity, inconsistent alignment from cell to cell, shifting of cells during assembly, poor volumetric efficiency and vulnerable edges which resulted in a non-uniform, low energy density and potentially unsafe performance. The interlocking frame design allow cells to be stacked onto a battery with a relatively tight alignment and high volumetric efficiency with improved safety since the shifting, sluffing, and vulnerable edges are eliminated. The use of interlocking frames in the assembly of a lithium-polymer battery allows for precise alignment and tight compression of the planar cells such as cells 50a–50e resulting in high volumetric efficiency. The frames are designed to interlock, but not compress together under the vacuum packaging. That is, the thickness of the battery 30 is determined mainly by the thickness of the planar battery cells at their thickest point which would be for example, the portion 66 of the battery section 50. The frames prevent the pinching, buckling and fraying of the electrode stack during the assembling and packaging, and create a more rigid battery structure. During the vacuum packaging which is described below, the planar battery cells might have sluffed together so that the laminar cathode electrolyte sections would rub off. The frames prevent such sluffing.

Battery 30 can be constructed by placing a small stack such as stack 68 onto a frame such as frame 32 and placing a second frame such as frame 34 onto the stack 68 so as to interlock with the first frame 32 and restrict the horizontal shifting of the stack 68. Small stacks of battery cells and frames are added so that the frames interconnect and so that the anode and cathode tabs fit through the spaces in the frames as seen in FIG. 5 which is discussed below. Looking again at FIG. 3, once the frames and the small stacks are put together, the battery 30 can be vacuum sealed using vacuum seal package materials 70 and 72 that form a vacuum seal around the battery. The vacuum seal package can be comprised of layers including insulating layers 70a and 70c which can be comprised of nylon or polyethylene. The vacuum seal material can further be comprised of a thin aluminum layer 70b which can be used for preventing gases such as a water vapor to move in or out of the battery 30 package. Material 72 may have the same structure as material 70. The vacuum sealing can be done by sealing vacuum seal materials 70 and 72 together to form a seal 74 which surrounds the battery 30. This vacuum seal crimps together the vacuum seal package materials 70 and 72 with an adhesive material or under heat so as to form the seal 74. This vacuum sealing compresses the planar battery cells so as to reduce the size of the battery. Additionally, the vacuum sealing holds the battery 30 together.

The frames 32, 34, 36, 38, 40, 42 and 44 cause the vacuum sealing process to compress the planar laminar batteries together vertically but prevent the horizontal shifting of the planar laminar batteries during the vacuum sealing process. The horizontal shifting is restricted because the obstruction such as the upper and lower portions of adjacent frames interlock. After the vacuum sealing, the frames aid in the rigidity of the battery.

The battery 30 also includes a flame barrier sheet 76 that surrounds the frames and the laminar planar battery cells and that is contained within the vacuum seal package materials 70 and 72. This flame barrier 76 can be used to prevent internal fires from moving out and external fires from moving into the battery. The flammability of the battery is a concern since the battery is, in the preferred embodiment, constructed of lithium planar battery cells.

In addition, a flame barrier such as flame barrier 78 can be placed in between the small stacks of planar battery cells. This flame barrier 78 is the subject of and is described in the co-pending application of Drew Tura and David Brongiel entitled "System for Preventing Ignition and Spread of Flames in Lithium Battery Applications", which is incorporated herein by reference. Note that the portions 66 of the battery section 50 are raised up because they contain both the masks and the lithium as to compared to the section 65 which does not contain the masks. For this reason, the flame barrier such as flame barrier 78 does not add to the maximum thickness of the battery 30.

Note that the frames could be constructed so that the lower portion of the frames is located in between the upper portion of an adjacent frame and the battery section so as to prevent the horizontal movement of the battery section and the individual planar battery cells. Such a construction can be seen by flipping over FIG. 3 such that frame 32 is the top frame and frame 44 is the bottom frame.

Battery section 50 has two sides. One side corresponding to the top of battery cell 50a and the other side corresponding to the bottom of battery cell 50e. Frame 40 has a first portion, the horizontal portion 40b, that contacts one side of the battery section 50 and a second portion, lower portion 40c, that protrudes from the first portion. Frame 38 has a first portion, the horizontal portion 38b, that contacts the other side of battery section 50 and a second portion, the upper portion 38a, that protrudes from the horizontal portion 38b. The upper portion 38a is arranged between the lower portion 40c and the battery section 50 so as to restrict the horizontal motion of the battery section 50.

An additional frame, frame 42 has a first portion, horizontal portion 42b, contacting a side of battery section 60 and a second portion, lower portion 42c, protruding from the horizontal portion 42b. A third portion, upper portion 40a, of frame 40 is arranged between the lower portion 42c and the battery section 60. Note that the frames 22 as shown in FIG. 2 are substantially parallel. Looking at FIG. 3, the horizontal portions 40b, 38b and 42c are substantially parallel as they ring around the battery sections 50 and 60.

The first, second and third portions of the frames are not limited to the upper and lower portions of the frames as described above. Other portions of the frames may be considered as the first, second and third portions.

FIG. 4 is a partial cross-sectional view of a lithium bi-cell 80 used in the present invention. This lithium bi-cell 80 corresponds to the cell 50a shown in FIG. 3. The lithium assembly 82 is comprised of a copper tab 84 surrounded by two pieces of lithium 86 and 88. The lithium assembly 82 is available from the Cyprus/Foote Mineral Company in Exton, Pa. A one mil thick mylar mask 90 and 92 is formed on both sides of the lithium assembly 82. The cathode material 98 and 100 and electrolyte material 94 and 96 are laminated on aluminum tab layers 102 and 104. The electrolyte material 94 and 96 then contacts the lithium assembly 82 and masks 90 and 92. The lamination process is described in Lee et al., U.S. Pat. No. 4,830,939 which is incorporated herein by reference.

The mask layers 90 and 92 cover portions of the lithium sections 86 and 88 so that undesirable edge effects do not occur. In addition, the masks prevent shorting in the area 106. The area 106 corresponds to the portion 64 of battery section 50 shown in FIG. 3. Looking again at FIG. 4, note that section 106 is thinner than the portion 110. The thickest portion of the laminar battery cell 80 is the portion 110 which includes both the masks 90 and 92 as well as the lithium 86 and 88. This portion 110 corresponds to the portion 66 shown in FIG. 3.

FIG. 5 is a partial cross-sectional view of the battery 30' of the present invention. This cross-section of the battery 30' shows the copper anode tabs such as tab 114 extending through the area 112 between frames 42' and 44'. This area may correspond to the area 18 in FIG. 1. The view of FIG. 5 is oriented along the line B–B' with respect to the frame 10 shown in FIG. 1.

Looking again at FIG. 5, each of the copper tabs of the cells such as cell 118 extends to a clamp portion 122. This clamp portion 122 connects the tabs such as tab 114 to a terminal 124. Part of the clamp portion 122 extends through a hole in the tabs and terminal 124. The holes 28 in the tabs can be best seen in FIG. 2.

As shown in FIG. 4, the lithium bi-cells 80 also contain aluminum cathode tabs 102 and 104. FIG. 5 shows aluminum cathode tab 126. These aluminum cathode tabs can extend out and are clamped by a similar clamping apparatus (not shown) such as clamp 122 at the other terminal area (not shown) of the battery. This clamp 122 is the subject of and is described in the co-pending application of Drew Tura and David Brongiel entitled "Fastener System of Tab Bussing for Batteries", which is incorporated herein by reference. The vacuum sealing materials 70' and 72' can be vacuum sealed around or to the terminal 124.

Various details of the implementation and method are merely illustrative of the invention. It will be understood that various changes of details may be within the scope of the invention, which is to be limited only by the appended claims.

What is claimed is:

1. A battery comprising:

a stack of planar battery cells; and a plurality of interlocking frames, said plurality of interlocking frames adapted to restrict the planar battery cells from slipping with respect to each other; the interlocking frames including a first frame with a ledge in a first plane, the first frame including an upwards projection and a downwards projection out of the ledge; the interlocking frames including a second frame with a ledge in a second plane, said second plane being parallel to the first plane, said second frame including an upwards projection and a downwards projection out of the ledge, wherein some of the cells in said stack of cells are located between the ledges of the first and second frames and wherein one of the projections from the first frame is located behind one of the projections of the second frame such that the movement of the first and second frames within the planes of the ledges is restricted, and wherein the thickness of said some of the cells between the ledges is such that the one of the projections from the first frame does not contact the ledge of the second frame and the one of the projections of the second frame does not contact the ledge of the first frame.

2. The battery of claim 1, wherein a plurality of said planar battery cells in said stack are located between each adjacent frame of said interlocking frames.

3. The battery of claim 1, wherein the frames are rectangular and the upward and downward projections are located on four sides of the first and second frames.

4. The battery of claim 1, wherein the upward portion of the first frame is located between the battery section and the downward portion of the first frame so as to restrict the horizontal movement of the some of the cells.

5. The battery of claim 4, wherein the interlocking frames include a third frame with a ledge in a third plane, said third plane being parallel to the first plane, said third frame including a downwards projection out of the ledge, wherein other cells in said stack of cells are located between the ledges of the first and third frames and wherein the downward projection of the third frame is located behind the upward projection of the first frame such that the movement of the first and third frames within the planes of the ledges is restricted.

6. The battery of claim 1, wherein the downward projection of the first frame is located behind the upward projection of the second frame.

7. The battery of claim 1, wherein the upward projection of the first frame is located behind the downward projection of the second frame.

8. The battery of claim 1, wherein the cells are lithium/polymer laminar bi-cells.

9. The battery of claim 1, wherein the battery cells are connected to anode and cathode terminals and wherein the first and second frames and the battery section except for portions of the terminals are surrounded in a vacuum sealed battery cover.

10. The battery of claim 1, wherein said first and second frames are rectangular in shape and wherein said battery cells are connected to anode and cathode tabs and wherein the downward projection of the first frame and the upward projection of the second frame extend around the rectangular frames and form spaces through which the tabs extend through the frames.

11. A method of forming a battery comprising the steps of:

placing a stack of at least one planar battery cell on a frame, the first frame including a horizontal ledge, and an upwards projection and a downwards projection out of the ledge;

placing a second frame with a horizontal ledge and an upwards projection and downwards projection out of the ledge onto the stack so as to interlock with the first frame and restrict the horizontal shifting of the stack, one of the projections from each of the first and second frame being positioned to prevent the relative horizontal movement of the first and second frames, the placing steps being such that the stack of at least one planar battery cell contacts the ledges of the first and second frames and said one of the projections from the first frame does not contact the ledge of the second frame and the one of the projections of the second frame does not contact the ledge of the first frame; and vacuum sealing the stack of at least one battery cell and first and second frame.

12. The method of claim 11 further comprising, before said vacuum sealing step, the steps of placing another stack of at least one battery cell on the stack of the first frame and placing a third frame to interlock with the first frame and to restrict the horizontal shifting of the second stack.

13. The method of claim 11, wherein the stack of planar battery cells include anode and cathode tabs, said first and second frame form spaces for the tabs and wherein said second frame placing step is done such that the tabs are placed through the spaces in the frames.

* * * * *